US007940765B2

(12) United States Patent
Rao et al.

(10) Patent No.: US 7,940,765 B2
(45) Date of Patent: May 10, 2011

(54) LIMITING UNAUTHORIZED SOURCES IN A MULTICAST DISTRIBUTION TREE

(75) Inventors: Sandeep Hebbani Raghavendra Rao, Bangalore (IN); Shyamasundar S. Kaluve, Bangalore (IN); Senthilkumar Krishnamurthy, San Jose, CA (US); Venkateshwar Rao Pullela, San Jose, CA (US); Ashwin Sampath, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 871 days.

(21) Appl. No.: 10/988,746

(22) Filed: Nov. 14, 2004

(65) Prior Publication Data
US 2006/0164984 A1 Jul. 27, 2006

(51) Int. Cl.
*H04L 12/28* (2006.01)
(52) U.S. Cl. ........................................ 370/390; 370/401
(58) Field of Classification Search .................. 370/389, 370/390, 392, 401, 432
See application file for complete search history.

(56) References Cited

U.S. PATENT DOCUMENTS

| | | | |
|---|---|---|---|
| 6,370,142 B1 * | 4/2002 | Pitcher et al. | 370/390 |
| 7,046,680 B1 * | 5/2006 | McDysan et al. | 370/396 |
| 7,120,147 B2 * | 10/2006 | Derango et al. | 370/390 |
| 2002/0150099 A1 * | 10/2002 | Pung et al. | 370/390 |
| 2003/0123453 A1 * | 7/2003 | Ooghe et al. | 370/395.53 |
| 2005/0114656 A1 * | 5/2005 | Liu et al. | 713/163 |

OTHER PUBLICATIONS

W. Fenner, Internet Group Management Protocol, Version 2, IETF Working Draft, Nov. 1997.
Christensen et al., Considerations for IGMP and MLD Snooping Switches, draft-ietf-magma-snoop-11.txt, IETF Working Draft, May 2004.
S. Deering, Host Extensions for IP Multicasting, IETF Working Draft, Aug. 1989.

* cited by examiner

*Primary Examiner* — Ricky Ngo
*Assistant Examiner* — Christine Ng
(74) *Attorney, Agent, or Firm* — The Law Office of Kirk D. Williams

(57) ABSTRACT

Disclosed are, inter alia, methods, apparatus, data structures, computer-readable media, and mechanisms for limiting unauthorized multicast sources. One or more access control lists are typically configured in a switching device to a state that denies forwarding of multicast packets with a particular host as its source. In response to a received multicast application admission-control message identifying the particular host, the one or more access control lists in the switching device are updated to allow multicast messages sent from the particular host to be forwarded. In one system, the received multicast application admission-control message is an Internet Group Management Protocol (IGMP) message. In response to the received multicast application admission-control message identifying the particular host, one system automatically adds one or more entries to the one or more access control lists to allow multicast traffic to be sent to and received from a next switching device leading to a corresponding multicast Rendezvous Point.

14 Claims, 4 Drawing Sheets

LIMITING UNAUTHORIZED SOURCES IN A MULTICAST DISTRIBUTION TREE

TECHNICAL FIELD

One embodiment of the invention relates to communications and computer systems, especially routers, packet switching systems, and other devices; and more particularly, one embodiment relates to limiting unauthorized sources in a multicast distribution tree.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Multicast Routing protocols like Protocol Independent Multicast-Sparse Mode (PIM-SM) and Bi-directional PIM achieve multicast forwarding by building a shared distribution tree rooted at Rendezvous Point (RP). In each of the routers (or switches), a single (*, G) entry is used to forward traffic down the shared tree. In Bi-directional, the same entry is used for forwarding traffic upstream towards the Rendezvous point, as well. In such shared tree based forwarding models, source-control is one of the biggest problems. Because traffic forwarding is achieved using a (*, G) entry, any unwanted malicious host can send multicast traffic at very high rates. This at least results in a waste of valuable network bandwidth, and lends itself to denial of service (DOS) attacks (e.g., attacks on a network by flooding it with useless traffic designed to consume the network resources).

In PIM-SM, data traffic from a source is encapsulated within a register message by the first hop router and sent via unicast packets to the Rendezvous Point (RP). Depending on the IP address of the source, the RP can decide to either forward the traffic down the shared tree or ignore the traffic. In either case, the RP sends back a register-stop message instructing the first hop router to stop sending register messages. Thus, traffic from an invalid source is encapsulated and forwarded by a first hop router (consuming its resources), and it is not dropped until it reaches the RP (consuming network and RP resources, and providing an opportunity DOS attacks). In Bi-directional PIM, these problems are even more aggravated by the fact that a common (*, G) forwarding entry is used to forward traffic in both directions (i.e., upstream towards the RP, and downstream away from the RP and towards the receivers). Although there is no protection is available to protect against malicious or unwanted sources, there is protection from unwanted receivers joining a multicast group through admission-control mechanisms that are available.

One approach to limit the problem is to use security Access Control Lists (ACLs) manually maintained by an administrator to limit the hosts which can send multicast traffic, such as by denying all but an explicit list of hosts. Clearly such a solution is not scalable.

SUMMARY

Disclosed are, inter alia, methods, apparatus, data structures, computer-readable media, and mechanisms for limiting unauthorized multicast sources. One embodiment configures one or more access control lists in a switching device to a state that denies forwarding of multicast packets with a particular host as its source. In response to a received multicast application admission-control message identifying the particular host, the one or more access control lists in the switching device are updated to allow multicast messages sent from the particular host to be forwarded. In one embodiment, the received multicast application admission-control message is an Internet Group Management Protocol (IGMP) message. One embodiment snoops Internet Group Management Protocol (IGMP) messages to identify the received multicast application admission-control message. One embodiment forwards the received multicast application admission-control message to another switching device or host. In one embodiment, after automatically updating the one or more access control lists, a particular multicast message with the particular host as its source is received and encapsulated in a register message, with register message being forwarded to a corresponding multicast Rendezvous Point. In response to the received multicast application admission-control message identifying the particular host, one embodiment automatically adds one or more entries to the one or more access control lists to allow multicast traffic to be sent to and received from a next switching device leading to a corresponding multicast Rendezvous Point. In one embodiment, the one or more access control lists include an access control list corresponding to a first interface for communicating with the next switching device and a second interface for communicating with the particular host.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
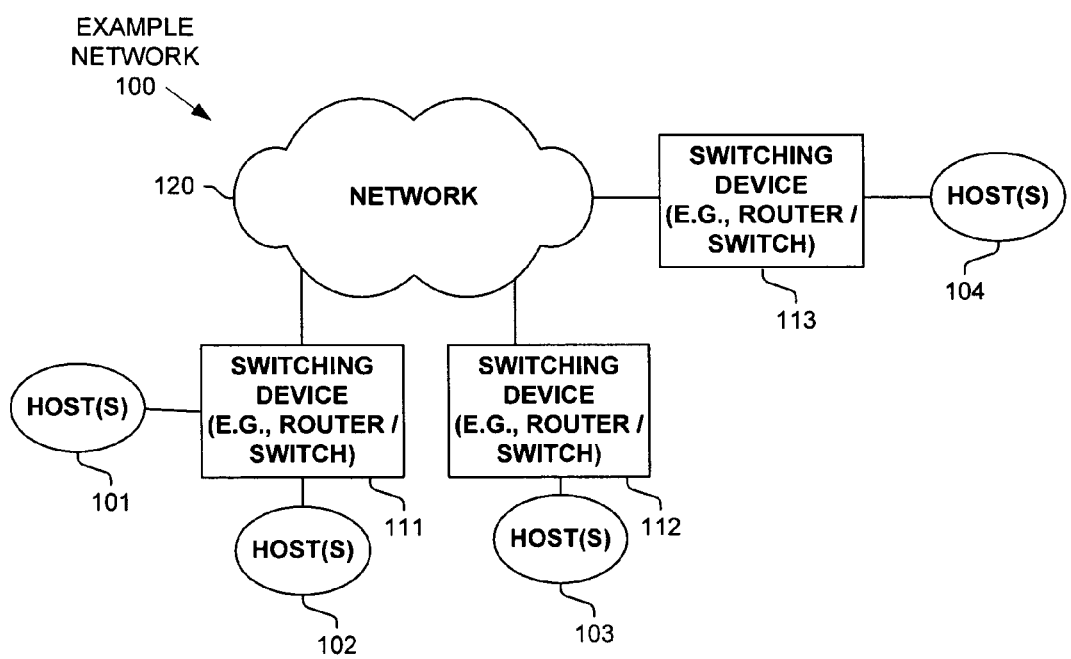
FIG. 1 is a block diagram of an exemplary network including one embodiment.

Disclosed are, inter alia, methods, apparatus, data structures, computer-readable media, and mechanisms for limiting unauthorized multicast sources.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising", which is synonymous with "including," "containing," or "characterized by," is inclusive or open-ended and does not exclude additional, unrecited elements or method steps.

Disclosed are, inter alia, methods, apparatus, data structures, computer-readable media, and mechanisms for limiting unauthorized multicast sources. One embodiment configures one or more access control lists in a switching device to a state that denies forwarding of multicast packets with a particular host as its source. In response to a received multicast application admission-control message identifying the particular host, the one or more access control lists in the switching device are updated to allow multicast messages sent from the particular host to be forwarded. In one embodiment, the received multicast application admission-control message is an Internet Group Management Protocol (IGMP) message. One embodiment snoops Internet Group Management Protocol (IGMP) messages to identify the received multicast application admission-control message. One embodiment forwards the received multicast application admission-control message to another switching device or host. In one embodiment, after automatically updating the one or more access control lists, a particular multicast message with the particular host as its source is received and encapsulated in a register message, with register message being forwarded to a corresponding multicast Rendezvous Point. In response to the received multicast application admission-control message identifying the particular host, one embodiment automatically adds one or more entries to the one or more access control lists to allow multicast traffic to be sent to and received from a next switching device leading to a corresponding multicast Rendezvous Point. In one embodiment, the one or more access control lists include an access control list corresponding to a first interface for communicating with the next switching device and a second interface for communicating with the particular host.

One embodiment limits unauthorized sources in a multicast distribution tree of multicast applications that exhibit the characteristic of being "self-contained". A self-contained group is typically a group of hosts in which every host that sources data traffic is also a member of the group. By making use of this property, one embodiment filters (e.g., drops) unwanted traffic originating from a host that is not a member of the corresponding group ideally at an early point in a network, such as at the first hop multicast router.

In one example of a self-contained group, every source for the group associated with a particular application with admission control is also a receiver of the group. One embodiment takes advantage of the admission-control processes of the particular application, rather than require a separate admission-control procedure to identify hosts which belong to a group. Internet Group Membership Protocol (IGMP) reports sent by a host for a particular group will translate into PIM-Joins. By snooping on the IGMP reports received on a first-hop multicast router, authorized senders are identified in one embodiment.

Hence, multicast forwarding states in the router are based on the IGMP-Reports as well as PIM-Joins and the incoming interface/DF-Interface/RP-Interface. If each of the routers involved in forwarding the multicast data enlist the permissible sources (IP or MAC address) who can send the data to that group through that router, then data from rest of the sources can be dropped. One embodiment derives this list of permissible sources based on the following rules at each multicast router along the shared tree. (1) If an IGMP report is received for the "self-contained" group on an interface, then data traffic, for the group from that interface with the source-IP and source-MAC of the host that sent the report, is valid. (2) If a PIM join is received for the "self-contained" group on an interface, then data traffic, for the group received on that interface with source-MAC of the router that sent the PIM-Join, is valid. (3) All traffic appearing for the "self-contained" group on the upstream interface leading to the RP (i.e., the RPF interface) with the source-MAC of the upstream router is valid. (4) The rest of the traffic which does not belong to any of the above three categories can be dropped as it is not valid, because such data traffic would be originating from hosts which are not members of the group.

The permit list of sources can then be imposed on the multicast forwarding model through the effective use of filtering mechanisms, such as those using Access Control Lists (ACLs), typically found on routers and switches. Incremental ACLs can be built-up on multicast enabled network interfaces dynamically, based on the reception of IGMP reports and PIM joins or from directly connected hosts and downstream routers respectively or from upstream router's address. These ACLs can then be used to restrict data traffic destined to the "self-contained" group from end hosts that are not themselves members of the group. For example, IP address based or MAC address based ACLs can be used for this purpose, with the use of MAC based ACLs possibly providing a finer level of security. These ACLs can be made as feature ACLs so that the scope of the rules within this ACL is limited to the traffic destined to the "self-contained" group.

One embodiment performs this by the following operations. (1) Initially start with a "deny all" ACL specific to the "self-contained" group on all multicast interfaces. This ACL is typically installed on all the multicast interfaces during initialization or as soon as the "self-contained" group definition is received from the RP. (2) When an IGMP report is received for the group from an end host, insert a "permit" entry in the ACL for that group and the source address of the host. Similarly, when IGMP decides to remove an end-host from the list of members, either, for example, because a leave was received from that end host for the group or because the end host did not respond to queries sent to that group, the "permit" ACE corresponding to the end-host and the group is removed. (3) When a PIM join is received from a downstream router for the group, add a permit entry in the ACL for the downstream router in the ACL corresponding for the self-contained group and the source MAC-address of that router. Similarly when an outgoing interface is pruned because of a PIM prune received from a downstream router remove the corresponding entry from the group's ACL. (4) On the RPF interface for each router install a permit ACE for the upstream router leading to the RP, for the corresponding group and the source MAC-address of that upstream router into that group's ACL. This will allow all traffic flowing down from the RP to the receivers.

The dynamic nature of this solution typically can withstand network topology changes, as well as configuration changes. For example, on any router other than the RP, when the upstream or the RPF interface changes, new ACLs will have to be created on the new upstream or RPF interface and the ACL for the earlier RPF interface will have to be modified accordingly.

These rules can be used both in PIM-SM as well as Bi-directional PIM forwarding models to effectively build up a permissible source list for the "self-contained" groups on all the routers. Of course, embodiments may be implemented using other multicast protocols, with appropriate corresponding operations performed or variants thereof to match the implementation protocol. In a PIM-SM scenario, the first hop router can decide not to send register messages to the RP based on the source of the multicast traffic. This will protect the RP from getting flooded from a malicious source. Thus, the authenticity of the source is decided at the first hop router, rather than the RP. In a Bi-directional PIM scenario, the first hop router can drop traffic from hosts, which are not themselves members of the group.

Security for the multicast conversation can be further strengthened by deploying this idea in conjunction with multicast admission control mechanisms.

One embodiment uses propagated ACLs for ports including four basic categories and their corresponding entry in their respective ACL:

(1) Host-Port: a port from which IGMP-Reports were received for the "self-contained" group. In one embodiment, the entries for the ACL are set as follows:

(a) S, G-PERMIT (b)*, G-DENY (2) Router-Port: a port which is either connected to a multicast router which is the upstream router or the router-port in the virtual LAN on which this router is the DF (in the case of Bi-directional PIM). In one embodiment, the entry for the ACL is set as follows:

(a) Port-ACE to be set: 1. *, G-PERMIT (3) Host-Router Port: a port which is a host-port as well as router-port, usually inter-switch links. In one embodiment, the entry for the ACL is set as follows:

(a) Port-ACE to be set: 1. *, G-PERMIT

Note, from this port, one embodiment does not maintain a permit-list of directly-connected hosts, as this action will be handled in the connecting switch, with these hosts will be seen through just Host-Ports.

(4) Non-Multicast-Port: a default port (i.e., a port which is not in one of the previous categories):

(a) Port-ACE to be set: 1. *, G-DENY

FIG. 1 is a block diagram of an exemplary network 100 using one embodiment. Shown are multiple hosts 101-104, switching devices (e.g., routers, switches, etc.) 111-113, and a sub-network 120, interconnected as shown. One or more of switching devices 111-113 are configured to limit unauthorized multicast sources as described herein for one or more multicast applications, typically with each multicast application being identifiably filtered independently of the others (e.g., a host may be authorized for less than all of the possible multicast application, and a multicast application admission-control message typically corresponds to a single particular application). Although, one embodiment does not make a distinction between some or all multicast applications, and thus, a multicast application admission-control message may affect multiple or even all multicast applications.

Figure 2:
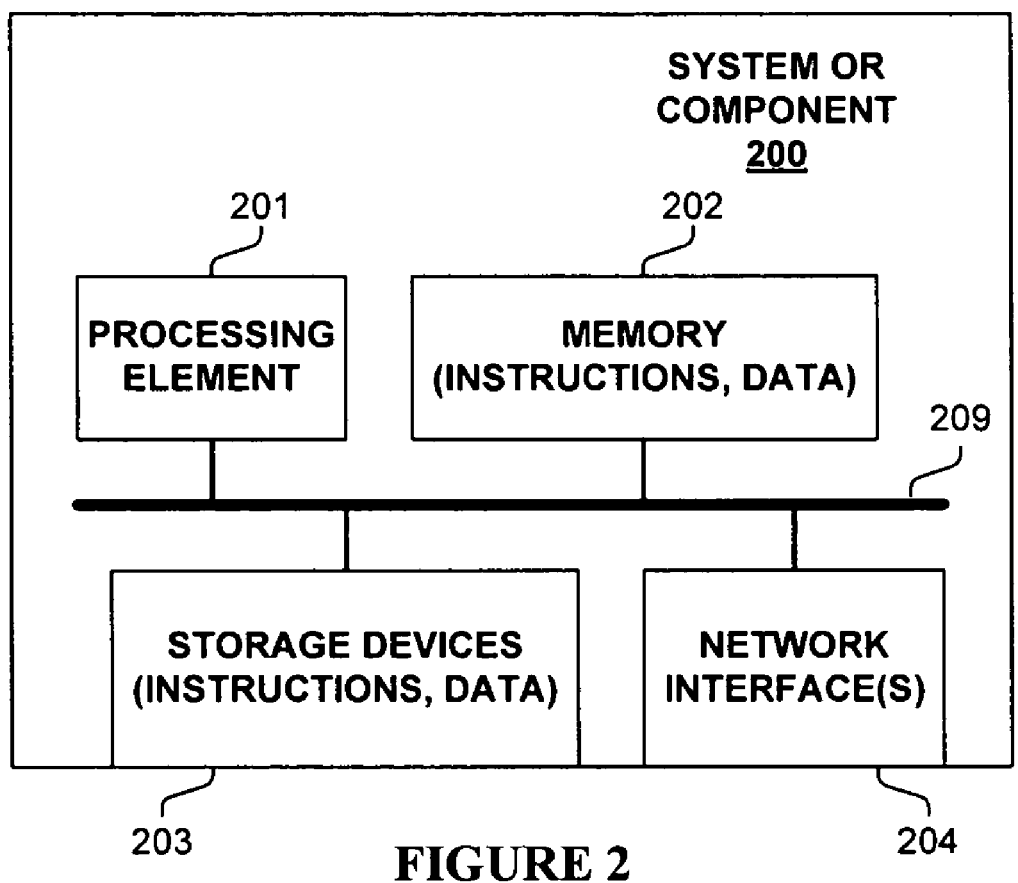
FIG. 2 is a block diagram of an exemplary system or component of one embodiment.

FIG. 2 is a block diagram of a an exemplary system or component 200 used in one embodiment limiting unauthorized multicast sources. In one embodiment, system or component 200 performs one or more processes corresponding to one of the flow diagrams illustrated or otherwise described herein.

In one embodiment, component 200 includes a processing element 201 (e.g., a processor, customized logic, etc.), memory 202, storage devices 203, and one or more network interfaces 204 for receiving and sending packets, items, and/or other information, which are typically coupled via one or more communications mechanisms 209 (shown as a bus for illustrative purposes.) Various embodiments of component 200 may include more or less elements. The operation of component 200 is typically controlled by processing element 201 using memory 202 and storage devices 203 to perform one or more scheduling tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with the invention. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with the invention.

Figure 3:
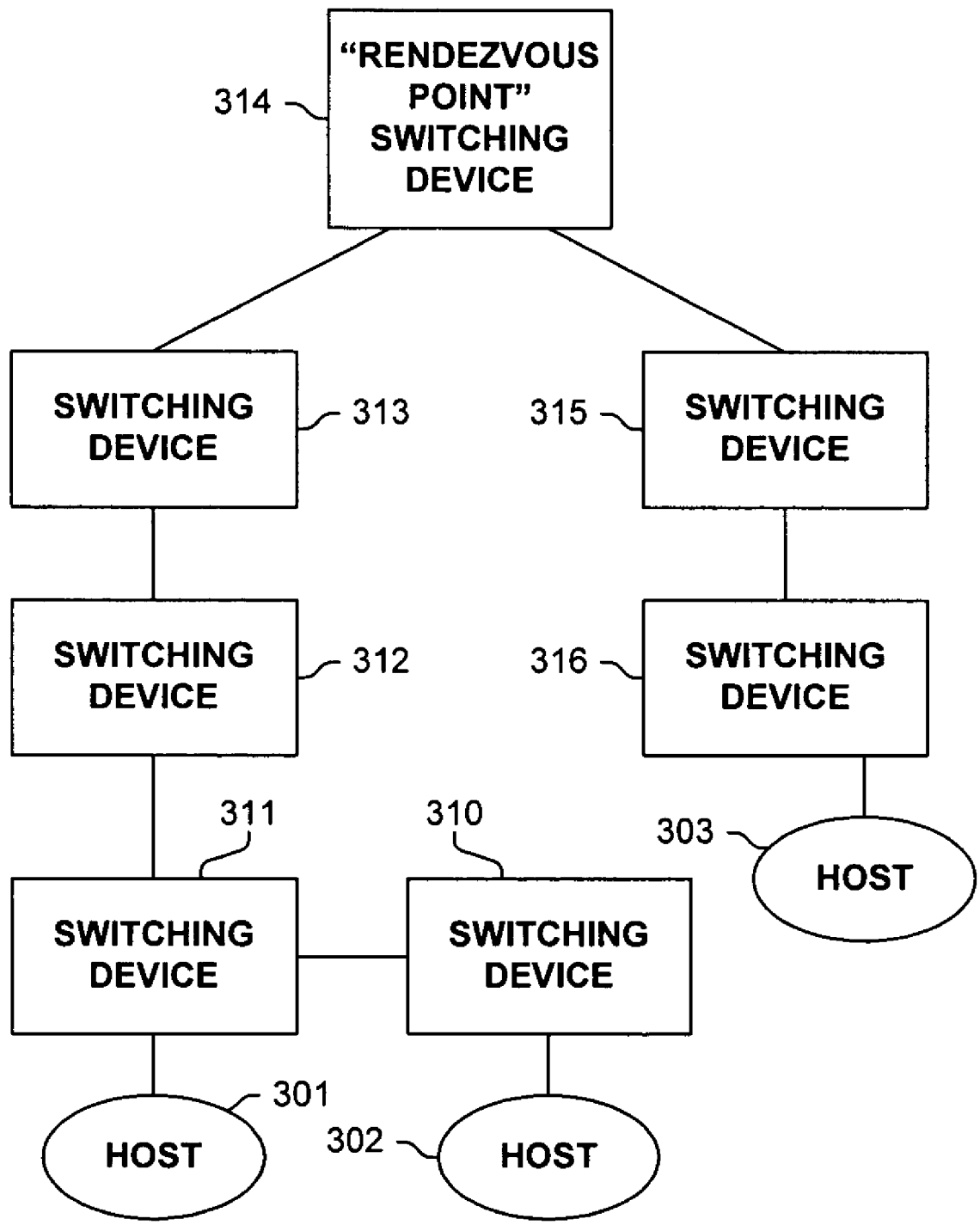
FIG. 3 is a block diagram of a logical view of an exemplary network including one embodiment.

FIG. 3 is a block diagram of a logical view of an exemplary multicast network (including one embodiment) for a multicast application. Shown are multiple hosts 301-303, multiple switching devices (e.g., routers, switches, etc.) 310-316, with switching device 314 acting as the rendezvous point for at least one of the multicast applications.

In one embodiment, hosts 301-303 are participating in a multicast application. Initially, switching device 311 might not allow host 301 to send multicast traffic as part of that application (e.g., to the corresponding multicast group). However, by snooping on the application-layer multicast admission-control messages to and/or from host 301, switching device 311 may identify that host 301 is actually authorized to send traffic to the multicast group, and switching device 311 will automatically modify an access control list on the interface leading to host 301 such that it is now authorized to send traffic to the multicast group. Also, switching device 311 will authorize the multicast traffic between switching device 311 and 312 for the group, if it is not already authorized, such as in response to processing related to host 301 being a participant in the multicast application. Similar changes may be made in other switching devices 310 and 316 in response authorizations for hosts 302 and 303, respectively.

Figure 4:
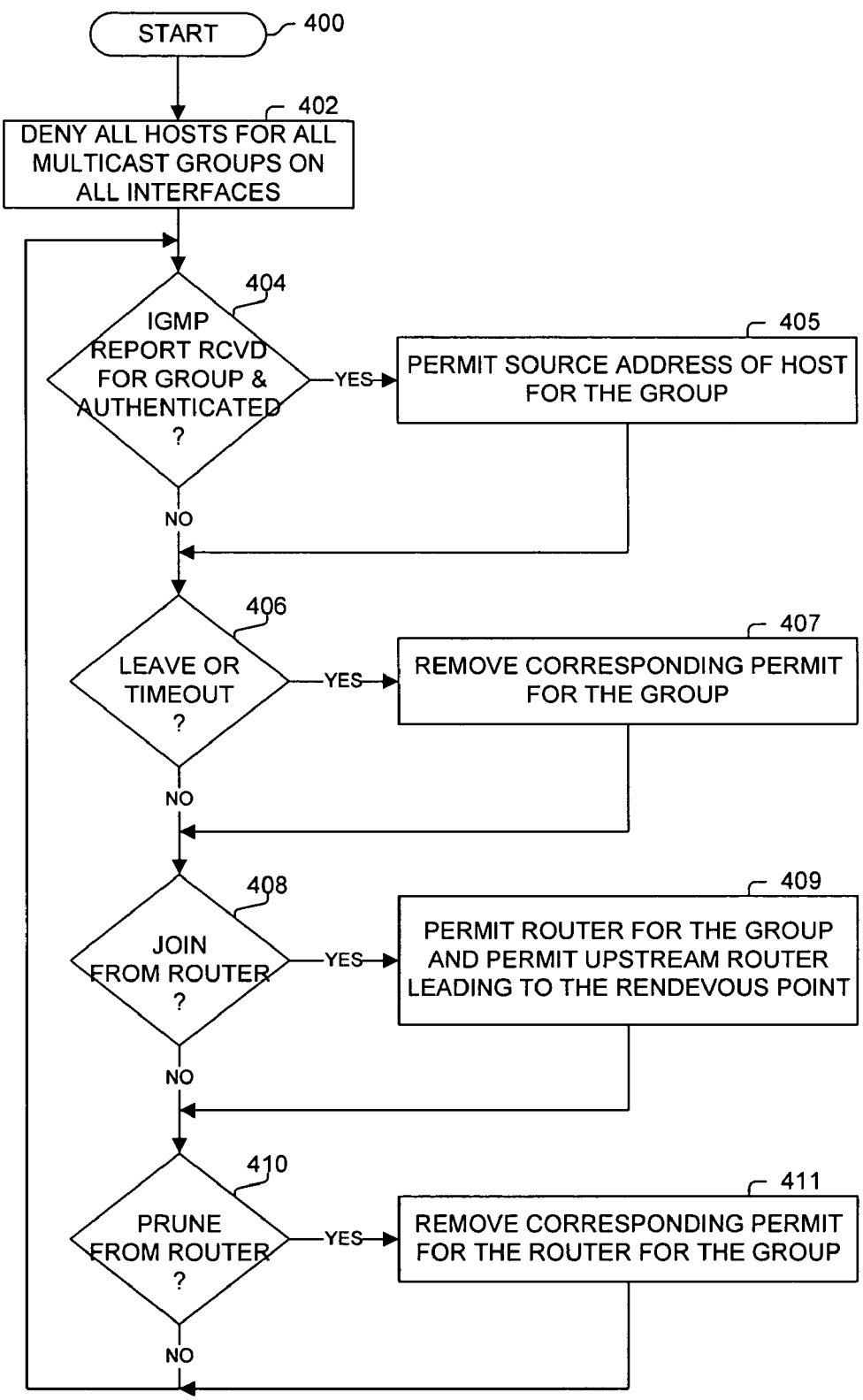
FIG. 4 is a flow diagram illustrating the updating of access control lists performed in one embodiment.

FIG. 4 is a flow diagram illustrating the updating of access control lists performed in one embodiment. Processing begins with process block 400, and proceeds to process block 402, wherein all hosts are denied for all multicast groups on all interfaces (e.g., upon initialization or as soon as the "self-contained" group definition is received from the rendezvous point. As determined in process block 404, if a multicast application admission-control message (e.g., an IGMP report) is received for a multicast group from a directly connected host and is authenticated (e.g., checking the admission-control information base of the application), then in process block 405, the access control list for that interface is updated to allow the source address of the host to send multicast packets to the multicast group. Otherwise, as determined in process block 406, if a leave multicast group message was received or a timeout occurred, then in process block 407, the corresponding permit entry in the ACL is removed. Otherwise, as determined in process block 408, if a join request is received from another switching device, then in process block 409, the ACL for the interface communicating with that switching device is updated to permit corresponding group traffic from and to the switching device, and the ACL for the interface communicating with the next hop switching device leading to the rendezvous point is updated to permit corresponding group traffic from and to that switching device. Otherwise, as determined in process block 410, if a prune multicast group message was received, then in process block 411, the corresponding permit entry in the ACL for the switching device is removed. Processing returns to process block 404.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, performed by a switching device, with the method comprising:
   initially configuring a particular interface of the packet switching device to drop multicast data packets received from a plurality of hosts for a particular multicast group, with the plurality of hosts including a particular host; wherein the packet switching device is a first hop router for the particular host;
   receiving, from the particular host, by the packet switching device on the particular interface a datagram packet, with the datagram packet encapsulating a multicast application admission-control message for the particular multicast group identifying the particular host is a member of the particular multicast group; and
   automatically updating, in response to processing exclusively by the packet switching device of said received multicast application admission-control message: the particular interface to allow multicast data messages for the particular multicast group sent from the particular host such that said multicast data messages for the particular multicast group will no longer be dropped by the switching device, while the particular interface continues to be configured to drop multicast data packets sent to the particular multicast group by other hosts of the plurality hosts; wherein the particular interface was in a state that caused said multicast data messages sent from the particular host to be said dropped by the particular interface when said automatically updating operation was performed.

2. The method of claim 1, wherein the received multicast application admission-control message is an Internet Group Management Protocol (IGMP) message.

3. The method of claim 1, comprising snooping Internet Group Management Protocol (IGMP) messages to identify the received multicast application admission-control message.

4. The method of claim 1, comprising forwarding the received multicast application admission-control message to another switching device or host.

5. The method of claim 1, comprising: after said automatically updating, receiving a particular multicast data message with the particular host as its source, encapsulating the particular multicast data message in a register message, and forwarding the register message to a corresponding multicast Rendezvous Point.

6. The method of claim 1, wherein the switching device includes a second interface for communicating with a next switching device leading to a corresponding multicast Rendezvous Point; and wherein the method comprises: receiving a join request from the next switching device, and in response, updating one or more access control lists for the second interface to permit traffic for the particular multicast group to be sent and received between the second interface of the switching device and the next switching device.

7. The method of claim 1, wherein said operation of automatically updating is performed by the packet switching device in response to said processing exclusively by the packet switching device solely of said received datagram.

8. The method of claim 7, wherein said received multicast application admission-control message is an Internet Group Management Protocol (IGMP) message.

9. The method of claim 7, comprising snooping Internet Group Management Protocol (IGMP) messages to identify said received multicast application admission-control message.

10. A packet switching device, comprising:
    a particular interface including a filtering mechanism configured for filtering packets; and
    one or more processors and memory, wherein the memory stores one or more instructions that, when executed by said one or more processors, perform operations comprising:
    initially configuring the particular interface to drop multicast data packets received from a plurality of hosts for a particular multicast group, with the plurality of hosts including a particular host; wherein the packet switching device is a first hop router for the particular host; and
    processing exclusively by the packet switching device of a multicast application admission-control message received on the particular interface in a datagram packet from the particular host, with the datagram packet encapsulating the multicast application admission-control message for the particular multicast group identifying the particular host is a member of the particular multicast group, with said processing including automatically updating the particular interface to allow multicast data messages for the particular multicast group sent from the particular host such that said multicast data messages for the particular multicast group will no longer be dropped by the switching device, while the particular interface continues to be configured to drop multicast data packets sent to the particular multicast group by other hosts of the plurality hosts; wherein the particular interface was in a state that caused multicast data messages sent from the particular host to be said dropped by the particular interface when said automatically updating operation was performed.

11. The packet switching device of claim 10, wherein the received multicast application admission-control message is an Internet Group Management Protocol (IGMP) message.

12. The packet switching device of claim 10, wherein said operations comprise: snooping Internet Group Management Protocol (IGMP) messages to identify the received multicast application admission-control message.

13. The packet switching device of claim 10, wherein said operations comprise: forwarding the received multicast application admission-control message to another switching device or host.

14. The packet switching device of claim 10, wherein said operations comprise: after said automatically updating, receiving a particular multicast message with the particular host as its source, encapsulating the particular multicast message in a register message, and forwarding the register message to a corresponding multicast Rendezvous Point.

* * * * *